(12) United States Patent
Pan

(10) Patent No.: US 11,602,715 B1
(45) Date of Patent: Mar. 14, 2023

(54) WET SCRUBBER

(71) Applicant: Yan-Ru Pan, Tainan (TW)

(72) Inventor: Yan-Ru Pan, Tainan (TW)

( * ) Notice: Subject to any disclaimer, the term of this patent is extended or adjusted under 35 U.S.C. 154(b) by 0 days.

(21) Appl. No.: 17/515,585

(22) Filed: Nov. 1, 2021

(51) Int. Cl.
*B01D 47/06* (2006.01)
*B01D 47/14* (2006.01)
*B01D 53/78* (2006.01)

(52) U.S. Cl.
CPC ............ *B01D 53/78* (2013.01); *B01D 47/06* (2013.01); *B01D 47/14* (2013.01)

(58) Field of Classification Search
CPC ........ B01D 53/78; B01D 47/06; B01D 47/14; B01D 47/00; B01D 50/00; B01D 53/14; B01D 53/38; B01D 2258/0283; B01D 2259/124; B01F 23/23; B01F 23/231; B01J 10/002; B01J 19/26; B01J 2219/00889
See application file for complete search history.

(56) References Cited

U.S. PATENT DOCUMENTS

| | | | |
|---|---|---|---|
| 3,502,441 A | * 3/1970 | Hudson | B01J 19/1881 55/440 |
| 3,707,067 A | * 12/1972 | Dietrick | B01D 47/06 261/78.2 |
| 4,224,158 A | * 9/1980 | Molvar | B01F 25/312 210/220 |
| 4,308,241 A | * 12/1981 | deVries | B01F 25/31243 423/243.08 |
| 4,375,455 A | * 3/1983 | Teller | B01J 19/26 423/239.1 |
| 5,061,406 A | * 10/1991 | Cheng | B01F 25/3122 261/76 |

FOREIGN PATENT DOCUMENTS

| | | | | |
|---|---|---|---|---|
| CN | 105 879 641 A | * | 8/2016 | ............ B01D 53/501 |
| CN | 206 604 327 U | * | 11/2017 | ............ B01D 45/02 |
| CN | 108 404 607 A | * | 8/2018 | ............ B01D 53/18 |
| KR | 10 0 844 178 B1 | * | 7/2008 | ............ B01D 47/14 |
| TW | I372075 B | | 9/2012 | |
| TW | M535595 U | | 1/2017 | |
| TW | I644729 B | | 12/2018 | |

* cited by examiner

Primary Examiner — Timothy C Vanoy

(57) ABSTRACT

A wet scrubber at least comprises a treatment tank, a jet pipe, a gas-liquid separation component, and a spray component. The treatment tank is used to contain a cleaning solution. The jet pipe is disposed in the treatment tank, by injecting the cleaning solution to suck in an exhaust gas, and mixing the cleaning solution with the exhaust gas, and directly injecting into the cleaning solution contained in the treatment tank, thereby forming a plurality of microbubbles in the cleaning solution to dissolve the exhaust gas and capture solid particles in the exhaust gas. The gas-liquid separation component is used to filter and block water mist raised in the cleaning solution. The spray component is used to prevent the solid particles from clogging the gas-liquid separation component.

19 Claims, 7 Drawing Sheets

WET SCRUBBER

BACKGROUND OF THE INVENTION

1. Field of Invention

The invention relates to an exhaust gas and solid particle treatment device, and more particularly to a wet scrubber for exhaust gas and microparticles.

2. Description of the Related Art

Exhaust gas such as industrial waste gas is generally considered to be the source of various environmental problems, such as ozone layer depletion, global warming and acid rain, and is especially related to the health problems of people working or living in the affected areas. For example, the incineration of organic substances often leads to the formation of carbon dioxide and nitro oxides, among which there are volatile organic compounds that cause smog problems in urban areas. These pollutions can cause various health and environmental problems, such as lung disease and cancer, as well as negative effects on surrounding plants. With the awakening of environmental protection awareness, the government has begun to formulate stricter emission requirements, so the industry urgently needs economically feasible solutions with enhanced treatment capabilities.

Wet scrubber is one of the exhaust gas purification systems commonly used currently. Traditional wet scrubbers usually require high-pressure pump and blower to atomize the solution to be mixed with industrial exhaust gas, so as to achieve the functions of dissolving the exhaust gas and capturing solid microparticles therein. For example, both the "dust filtering and cleaning device" disclosed in Taiwan invention patent No. 1644729 and the "vertical multi-parallel plates scrubber" disclosed in Taiwan invention patent No. 1372075 are wet scrubbers. The water used in this type of wet scrubber is usually collected in a container for disposal. However, it is not uncommon for scrubbers to run more than 250 gallons of water per hour (or 6,000 gallons per day). Therefore, the traditional wet scrubbers are not only expensive, but also have high operating cost.

Moreover, toxic exhaust gas produced in the industrial process will be mixed with small dust and other solid particles. Therefore, the traditional wet scrubbers will produce quite hard powder which adheres to the pipe wall of the exhaust gas (waste gas) conveying pipe, and finally causes the outlet of the exhaust gas conveying pipe to be clogged by the powder. Therefore, maintenance personnel need to clean up frequently, and need to dismantle many components during cleaning, which is quite inconvenient and wastes manpower and material resources. Taiwan utility model patent No. M535595 discloses a "delivery tube assembly and gas-liquid mixing stirrer having the same", in which the flexible pipe sways with the flow of water to knock off the powder adhering to the wall of the flexible pipe. However, this method will cause the flexible pipe or the rod to break, and even need to be cleaned or replaced every few days. On the contrary, it requires frequent maintenance and increases the cost.

SUMMARY OF THE INVENTION

In view of the above, an object of the invention is to provide a wet scrubber to solve the above-mentioned problems of the prior art.

The main reason for the insufficient capability of traditional wet scrubbers to capture small solid particles is that the size of the water droplets in the water mist must be close to the size of the particles, and the speed must be increased to have a good capture effect. However, it is not easy to achieve these two requirements. In view of this, a main object of the invention is to provide a wet scrubber capable of generating a high negative pressure to absorb an exhaust gas, which not only capable of preventing solid particles such as dust from clogging an outlet of an exhaust gas conveying pipe, but also capable of effectively mixing gas with liquid. Then, a fluid formed after mixing gas with liquid is cut into microbubbles (with an average diameter less than about 1.0 mm) due to pressure changes. With greatly increased surface area per unit volume (surface area divided by volume, that is, specific surface area) of the microbubbles, solubility of the exhaust gas and capture rate of the solid particles can be increased, especially for solid particles smaller than PM 2.5. Moreover, the time that the microbubbles stay in a cleaning solution is inversely proportional to the average diameter of the microbubbles.

Different from the traditional wet scrubbers, the invention adopts microbubble technology to improve a treatment efficiency of the exhaust gas and the solid particles. Since the ratio of surface area to volume of the microbubbles is greatly increased, a reaction efficiency of the exhaust gas and the cleaning solution will also be improved. At the same time, in the microbubbles, since thermal motion of the exhaust gas molecules and microparticles is at a high speed, and a space of the microbubbles is greatly reduced, a probability of the microbubbles reacting with the cleaning solution can be increased. In addition, a buoyancy of the microbubbles is much smaller than that of ordinary bubbles or mini bubbles, so the time staying in the cleaning solution will increase greatly. Therefore, based on the above factors, the wet scrubber of the invention is capable of greatly improving dissolution of the exhaust gas molecules and a capture rate of the particles. In addition, the wet scrubber of the invention is relatively inexpensive and simple to operate.

In order to achieve the foregoing object, the invention discloses a wet scrubber at least comprising: a treatment tank used to contain a cleaning solution; a jet pipe disposed in the treatment tank, the cleaning solution being injected into the treatment tank in a linear motion through the jet pipe, thereby generating a negative pressure to suck in an exhaust gas and performing a washing treatment on the exhaust gas, wherein the cleaning solution mixes with the exhaust gas in the washing treatment and cuts the exhaust gas into a plurality of microbubbles and a time the microbubbles stay in the cleaning solution is increased by increasing a surface area per unit volume of the microbubbles, so as to efficiently dissolve the exhaust gas and capture solid particles in the exhaust gas; a gas-liquid separation component located above a liquid level of the cleaning solution contained in the treatment tank to filter and block water mist raised in the cleaning solution, thereby allowing only the exhaust gas after the washing treatment to pass through the gas-liquid separation component and directly discharging the exhaust gas from an exhaust port of the treatment tank; and a spray component located above the gas-liquid separation component to prevent the solid particles from blocking the gas-liquid separation component.

Preferably, the wet scrubber of the invention further comprises a circulation pipeline, one end of the circulation pipeline being communicated to the treatment tank to discharge and filter the cleaning solution, another end of the circulation pipeline being communicated to the jet pipe to cyclically inject the cleaning solution into the treatment tank through the jet pipe in the linear motion, wherein the cleaning solution is injected into the jet pipe through the circulation pipeline.

Preferably, the circulation pipeline is further provided with a filter component to filter the cleaning solution discharged from the treatment tank.

Preferably, the circulation pipeline is further communicated with a bypass pipeline on two sides of the filter component, so that the negative pressure is continuously generated to suck in the exhaust gas when the filter component is replaced.

Preferably, the wet scrubber of the invention further comprises a cooling component for reducing a temperature of the cleaning solution contained in the treatment tank to increase a solubility of the exhaust gas.

Preferably, the gas-liquid separation component is a fiber bed demister, and a glass fiber diameter of the fiber bed demister is between 100 μm and 1 μm.

Preferably, the wet scrubber of the invention further comprises another gas-liquid separation component provided at the exhaust port of the treatment tank, wherein the other gas-liquid separation component is a fiber bed demister, and a glass fiber diameter of the fiber bed demister is between 100 μm and 1 μm.

Preferably, the wet scrubber of the invention further comprises a water filling component to replenish the cleaning solution into the treatment tank according to a height of a liquid level of the cleaning solution.

Preferably, the wet scrubber of the invention further comprises at least one liquid level detecting component for detecting the height of the liquid level of the cleaning solution contained in the treatment tank.

Preferably, the wet scrubber of the invention further comprises a control component for controlling a flow rate of the cleaning solution injected into the jet pipe and/or a flow rate of the exhaust gas introduced into jet pipe.

Preferably, a time for the microbubbles to stay in the cleaning solution is inversely proportional to an average diameter of the microbubbles, and the average diameter of the microbubbles is less than 1.0 mm.

Preferably, a time for the microbubbles to stay in the cleaning solution is between 1 second and 10 seconds.

Preferably, a time for the microbubbles to stay in the cleaning solution is between 5 seconds and 10 seconds.

Preferably, the treatment tank comprises an inner tank and an outer tank, and a side surface of the inner tank has a through hole communicated to the outer tank.

Preferably, the cleaning solution contained in the treatment tank accounts for 50% to 90% of a chamber volume of the treatment tank.

Preferably, the jet pipe comprises: a gas-liquid mixing pipe comprising a hollow chamber and a jet nozzle communicated with each other, wherein the cleaning solution is injected from a liquid injection port at a top of the jet nozzle and ejected into the hollow chamber from an opening of the jet nozzle, a side surface of the hollow chamber is provided with a suction port for sucking in the exhaust gas; and a conveying pipe assembly communicated to a bottom end of the hollow chamber, the conveying pipe assembly comprises a hollow pipe and a hollow diffusion pipe communicated with each other, wherein an ejection outlet of the hollow diffusion pipe is immersed in the cleaning solution contained in the treatment tank.

Preferably, the jet pipe further comprises a hydraulic push-type rotary scraping structure disposed in the hollow chamber, and the hydraulic push-type rotary scraping structure is operated by the cleaning solution in the linear motion to prevent the solid particles from depositing or remove deposition of the solid particles.

Preferably, the hydraulic push-type rotary scraping structure comprises a scraper plate rotatably disposed on a bottom plate of the hollow chamber, and the scraper plate is rotated by the cleaning solution in the linear motion.

Preferably, a bottom plate of the hollow chamber is rotated by the cleaning solution in the linear motion, and the hydraulic push-type rotary scraping structure disposed on the bottom plate of the hollow chamber rotates with the bottom plate of the hollow chamber.

The invention further discloses a wet scrubber for removing solid particles in an exhaust gas, at least comprising: a treatment tank used to contain a cleaning solution, wherein the treatment tank is composed of an inner tank and an outer tank, and the inner tank is communicated to the outer tank; a jet pipe disposed in the treatment tank, the cleaning solution being injected into the inner tank of the treatment tank in a linear motion through the jet pipe, thereby generating a negative pressure to suck in the exhaust gas and performing a washing treatment on the exhaust gas to form a plurality of microbubbles in the cleaning solution to dissolve the exhaust gas and capture the solid particles in the exhaust gas, an average diameter of microbubbles being less than 1.0 mm, a time for the microbubbles to stay in the cleaning solution being as long as 10 seconds; a gas-liquid separation component disposed in the treatment tank to filter and block water mist of the cleaning solution raised by the microbubbles in the treatment tank, so that only the exhaust gas with the solid particles being removed passing through the gas-liquid separation component and directly discharging from an exhaust port of the treatment tank, wherein the gas-liquid separation component is a fiber bed demister, and a glass fiber diameter of the fiber bed demister is between 100 μm and 1 μm; a spray component disposed in the treatment tank and spraying atomized cleaning solution toward the gas-liquid separation component to wash away and remove the solid particles blocking the gas-liquid separation component; and a circulation pipeline, one end of the circulation pipeline being communicated to the treatment tank to discharge and filter the cleaning solution, another end of the circulation pipeline being communicated to the jet pipe, wherein the cleaning solution is injected into the jet pipe through the circulation pipeline.

In summary, according to the wet scrubber of the invention, the wet scrubber can have one or more of the following advantages: (1) A large amount of the microbubbles can be generated by the jet pipe to reduce a size of the exhaust gas bubbles, and significantly increase a surface area of the exhaust gas and the solid particles in contact with the cleaning solution, thereby capable of greatly improving a reaction efficiency of the exhaust gas and the solid particles with the surrounding cleaning solution. At the same time, due to the small buoyancy of the microbubbles, a speed of movement in the solution is slowed down, which can increase the time for the exhaust gas and solid particles to stay in the cleaning solution, thereby capable of more effectively capturing the solid particles and dissolving the exhaust gas in the cleaning solution. (2) The jet pipe is capable of generating suction to effectively suck out the exhaust gas in the exhaust gas conveying pipe, preventing deposition of the solid particles carried by the exhaust gas. (3) A temperature of the cleaning solution can be lowered by disposing the cooling component to improve a solubility of the exhaust gas, while ensuring that the cleaning solution will not continue to increase in temperature due to chemical reactions. (4) By disposing the gas-liquid separation component, the water mist composition in the discharged exhaust gas can be reduced. (5) By disposing the spray component, the gas-liquid separation component can be washed and the exhaust gas can be dissolved and/or the solid particles carried by the exhaust gas can be captured. (6) By disposing the bypass pipeline, when maintenance personnel replace the filter screen in the filter component, the cleaning solution can change a path and flow through the bypass pipeline, so there is no need to interrupt the overall cleaning process. (7) By disposing the maintenance port, maintenance personnel can perform repair or maintenance in the treatment tank without disassembling the entire structure. (8) With the treatment tank designed to be an assembled type, the invention is not limited to a height of an installation site of the wet scrubber.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
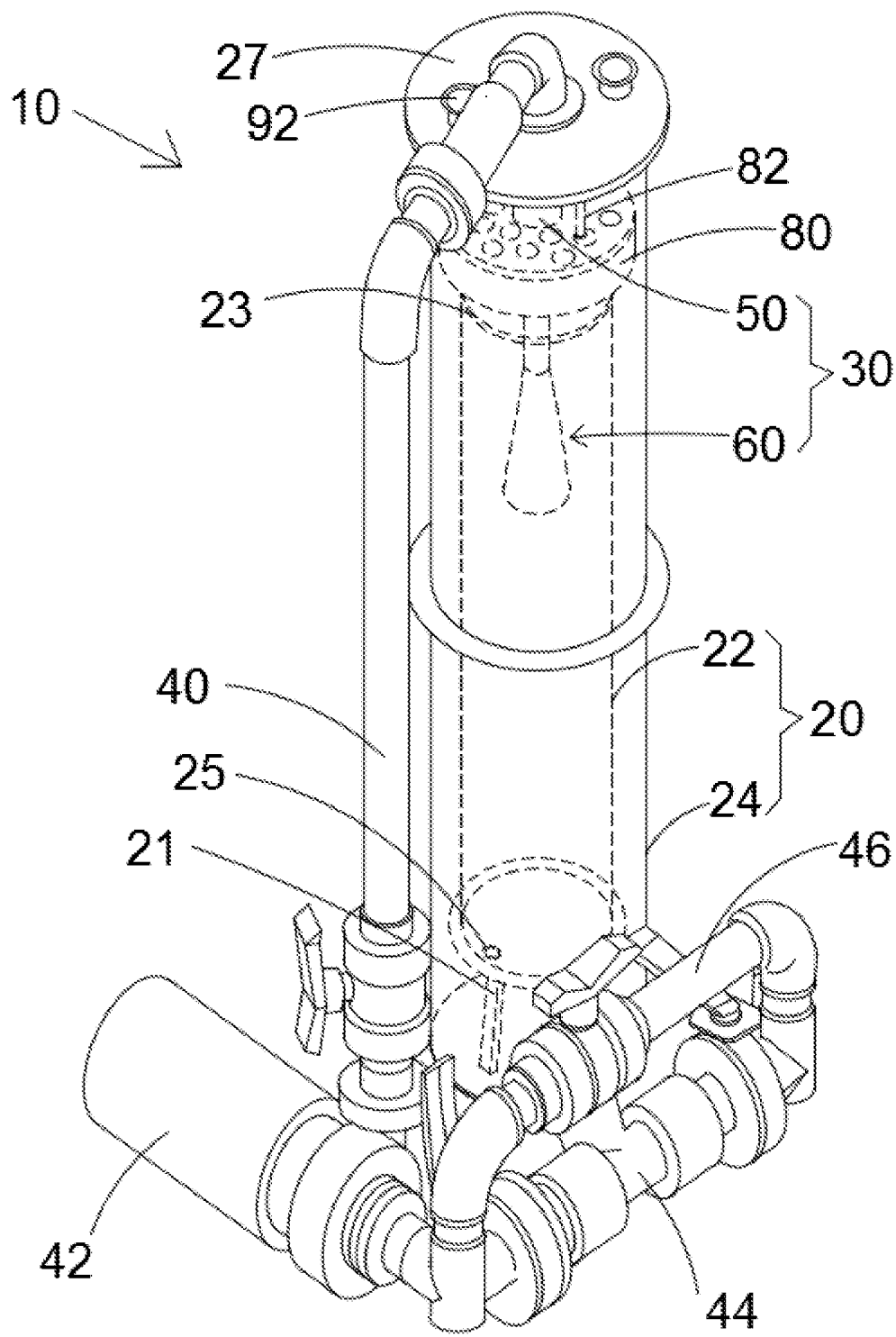
FIG. 1 is a perspective view of a wet scrubber of the invention.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

A wet scrubber 10 of the invention is capable of generating a high negative pressure to suck in an exhaust gas to solve the problem of blockage by solid particles and to generate microbubbles effectively. With greatly increased surface area per unit volume (surface area divided by volume) of the microbubbles, the invention is capable of increasing a time of the microbubbles staying in a cleaning solution in order to increase a solubility of the exhaust gas and a capture rate of the solid particles efficiently.

Figure 2:
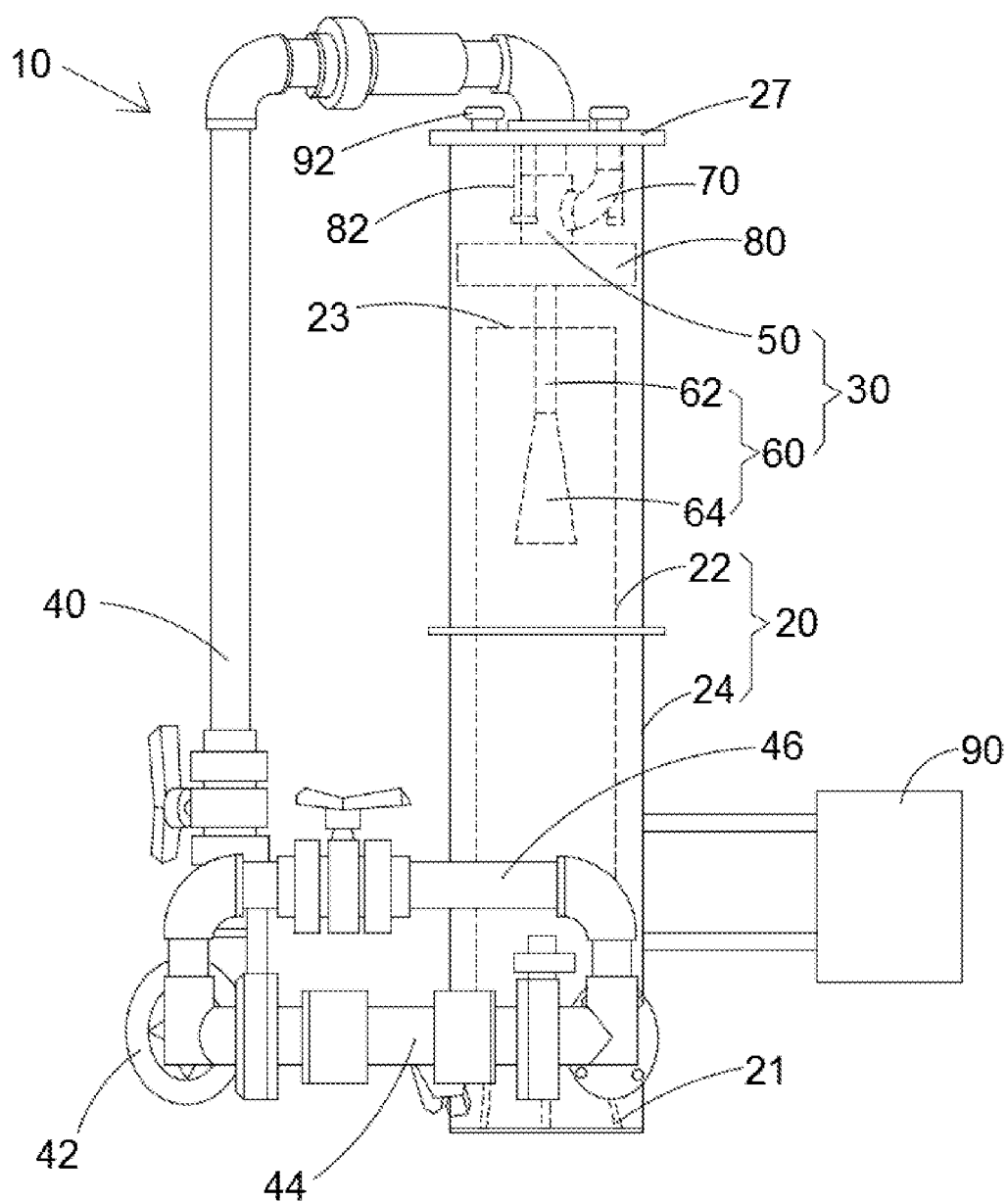
FIG. 2 is a side view of the wet scrubber of the invention.
Figure 3:
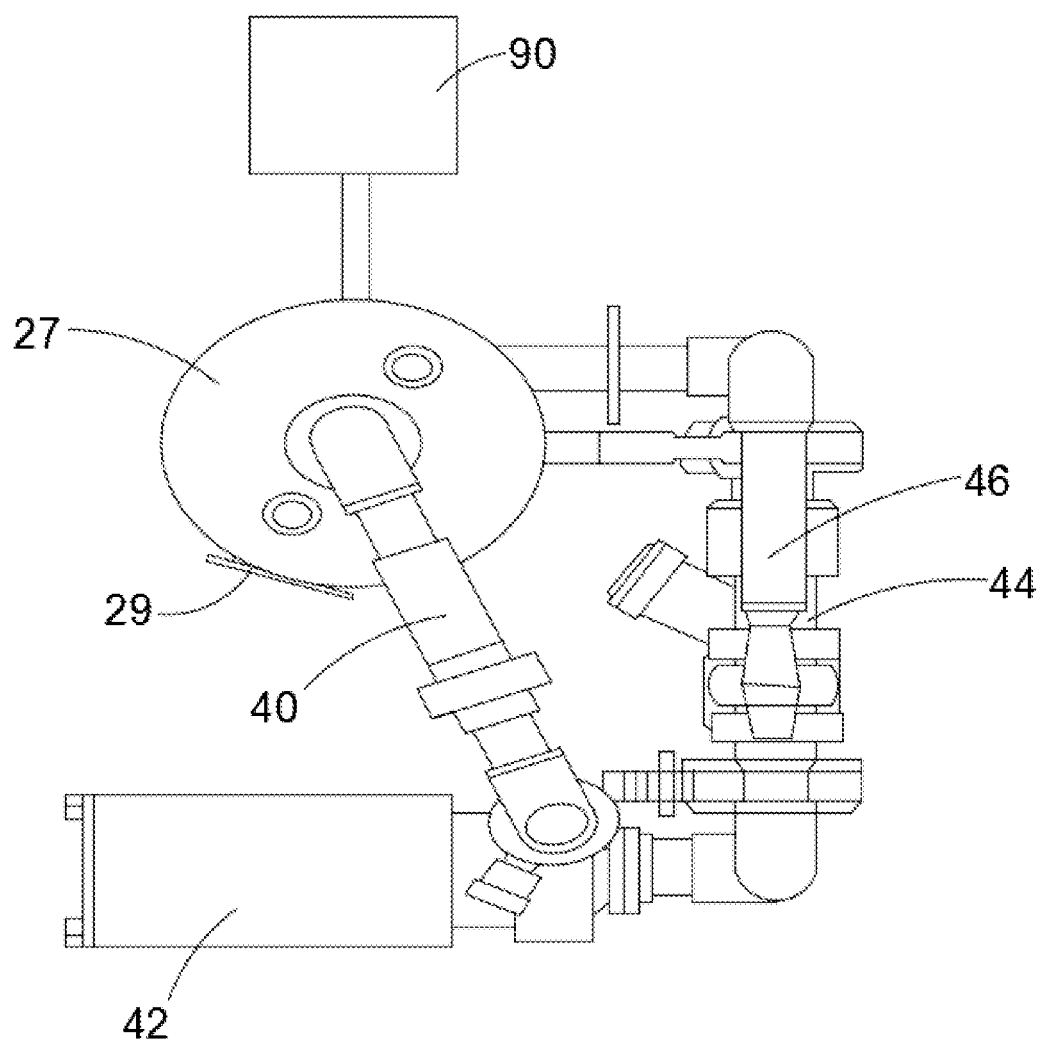
FIG. 3 is a top view of the wet scrubber of the invention.

As shown in FIGS. 1 to 3, the wet scrubber 10 of the invention at least comprises a treatment tank 20 and a jet pipe 30. The treatment tank 20 is used to contain the cleaning solution, and a height of a liquid level of the cleaning solution or a ratio of a volume of the cleaning solution to a chamber volume of the treatment tank 20 can be adjusted according to a supply flow rate of the cleaning solution and a discharge flow rate of the cleaning solution. For example, the volume of the cleaning solution accounts for about 50% to 90% of the chamber volume of the treatment tank 20, preferably about 60% to 80%, and more preferably about 70%. One side of the jet pipe 30 is used to inject the cleaning solution, and another side is communicated to an external exhaust gas source. The exhaust gas is mixed with the cleaning solution by sucking in the exhaust gas, and the exhaust gas is cut into a large amount of the microbubbles and then directly injected into the cleaning solution contained in the treatment tank 20, thereby forming a plurality of the microbubbles in the cleaning solution to dissolve the exhaust gas and capture the solid particles in the exhaust gas.

A feature of the jet pipe 30 of the invention is that the cleaning solution is injected into the cleaning solution contained in the treatment tank 20 in a linear motion, so that the exhaust gas is washed. The invention can not only mix the exhaust gas and cut the exhaust gas into a large amount of the microbubbles, but also bring the microbubbles into a depth of the cleaning solution in the treatment tank 20, so that a time for the microbubbles to pass through the cleaning solution is about 1 to 10 seconds, for example, and more preferably 5 to 10 seconds, that is, preferably up to about 10 seconds. Wherein, the larger the surface area per unit volume of the microbubbles, the longer the time the microbubbles stay in the cleaning solution, so as to efficiently dissolve the exhaust gas and capture the solid particles. Moreover, during a process of the cleaning solution flowing through the jet pipe 30 at a high speed, a vacuum can be formed to generate a negative pressure suction force to effectively suck out the exhaust gas in an exhaust gas conveying pipe 70 to prevent the solid particles from depositing at an outlet of the exhaust gas conveying pipe 70 and/or an exhaust gas suction port 51 of a hollow chamber 52. In addition, the hollow chamber 52 and/or the exhaust gas suction port 51 can be further provided with cleaning elements, such as for supplying liquid, gas, or sequentially supplying fluids of liquid and gas to clean and/or dry the solid particles depositing on the hollow chamber 52 and/or the exhaust gas suction port 51. Wherein, the above-mentioned fluids can also optionally push a hydraulic push-type rotary scraping structure described later at the same time.

Wherein, the cleaning solution is, for example, water or other cleaning solutions, such as alkaline solutions, and the exhaust gas is, for example, various waste gas components emitted during a manufacturing process, and for example, manufacturing waste gases generated in a semiconductor manufacturing process. The composition of the solution can be determined based on the gas composition to be treated in the exhaust gas. For example, the cleaning solution composed of fresh water is actually sufficient to capture a large amount of dust or solid particles, wherein the aqueous solution of the cleaning solution can wet and capture the dust or particles. In addition, the cleaning solution composed of fresh water and sodium hydroxide or other neutralizing agents (such as lime) is capable of effectively extracting and neutralizing a large amount of acidic substances, such as hydrochloric acid, sulfuric acid or other acid-containing components in the exhaust gas. Since acidic substances such as hydrochloric acid and sulfuric acid dissolve in water easily, if there is a suitable alkali in the cleaning solution composed of water, such as calcium hydroxide ($Ca(OH)_2$), calcium carbonate ($CaCO_3$) and/or sodium bicarbonate ($NaHCO_3$), which can be dissolved in water, acidic components in various production sources can be absorbed and neutralized to reduce the formation of acidic solutions.

The treatment tank 20 of the wet scrubber 10 of the invention can be composed of a single tank, or double tanks or multiple tanks, preferably composed of an inner tank 22 and an outer tank 24, and for the convenience of explaining the structure and operation of the invention, the following will take the double tanks as an example. Wherein, a longitudinal section of the inner tank 22 of the treatment tank 20 is, for example, U-shaped, a top side of the inner tank 22 has a tank opening 23, a bottom side has a foot stand 21, and a side surface (i.e., side wall) of the inner tank 22 preferably has at least one through hole 25, so that the cleaning solution can circulate between the inner tank 22 and the outer tank 24 through the through hole 25. Moreover, when the cleaning solution is injected into the inner tank 22 (directly injected into the inner tank 22 of the treatment tank 20) through the jet pipe 30 at a high speed using high pressure, a large amount of the microbubbles with reduced volume will be generated in the cleaning solution to stir or even raise up the cleaning solution. In addition, a longitudinal section of the outer tank 24 of the treatment tank 20 is also U-shaped, and a top side thereof has a cover 27 for detachably closing a tank opening of the outer tank 24. Wherein, the jet pipe 30 and the exhaust gas conveying pipe 70 pass through the cover 27 to enter the treatment tank 20, for example, and an exhaust port 92 of the treatment tank 20 is, for example, provided on the cover 27. A side surface (i.e., side wall) of the outer tank 24 of the treatment tank 20 further optionally has a maintenance port 29. By opening the maintenance port 29, the inside of the outer tank 24 can be connected to the outside, which is convenient for maintenance personnel to perform repair or maintenance. In addition, the outer tank 24 of the treatment tank 20 can be optionally designed to be an assembled type, that is, the outer tank 24 is formed by assembling a U-shaped tank with at least one hollow pipe, as shown in FIGS. 1 and 2, the outer tank 24 is formed by assembling the U-shaped tank located below and the hollow pipe located above the U-shaped tank. With the assembled design, the invention is not limited to a height of an installation site of the wet scrubber 10. A quantity of the hollow pipe is not limited, and can be, for example, more than one or two, and a user can select an appropriate quantity and length/size of the hollow pipe according to actual requirements.

A technical feature of the wet scrubber 10 of the invention is that the jet pipe 30 is applied to the exhaust gas treatment such as process waste gas. The cleaning solution is longitudinally injected by the jet pipe 30 to make the cleaning solution flow through the jet pipe 30 longitudinally, and the jet pipe 30 sucks in the exhaust gas laterally. Wherein the jet pipe 30 uses a jet nozzle 54 with a reduced opening, with this design, a flow rate can be increased to generate a vacuum negative pressure in a surrounding environment and suck out the exhaust gas in the exhaust gas conveying pipe 70 to prevent the solid particles from depositing at the outlet of the exhaust gas conveying pipe 70.

Figure 4:
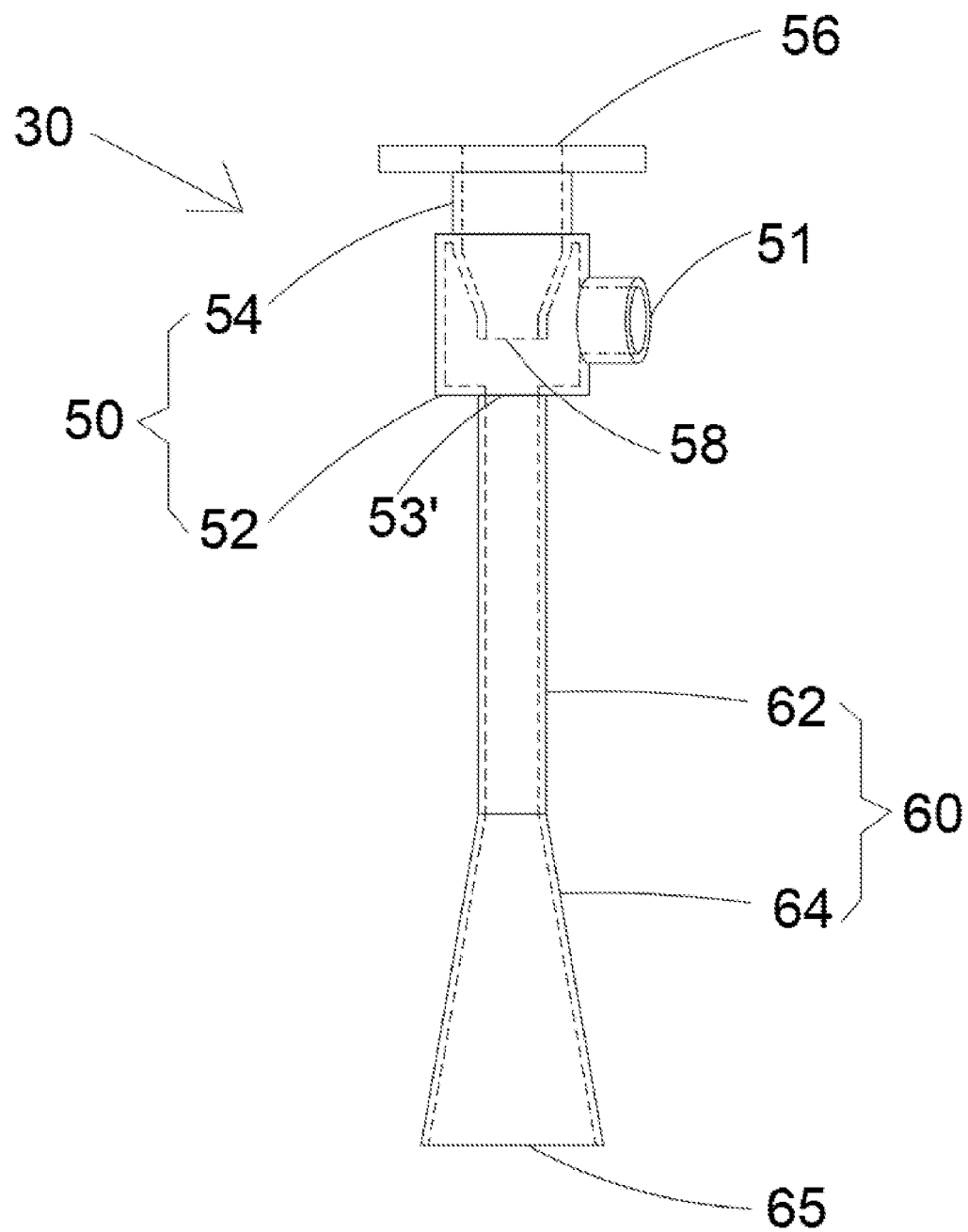
FIG. 4 is a schematic diagram of a jet pipe of the invention.

In detail, the jet pipe 30 of the wet scrubber 10 of the invention comprises, for example, a gas-liquid mixing pipe 50 and a conveying pipe assembly 60 that communicate with each other. Wherein, the gas-liquid mixing pipe 50 comprises, for example, the hollow chamber 52 and the jet nozzle 54 that communicate with each other. Wherein, the cleaning solution is injected from a liquid injection port 56 (larger opening diameter) at a top of the jet nozzle 54 and exported into the hollow chamber 52 from an opening 58 (smaller opening diameter) of the jet nozzle 54, and a side surface of the hollow chamber 52 is further provided with an exhaust gas suction port 51 for introducing the exhaust gas from the exhaust gas conveying pipe 70. The exhaust gas suction port 51 can be provided on the side surface of the hollow chamber 52 obliquely, for example. Wherein, an inner diameter of the jet nozzle 54 is gradually reduced from the liquid injection port 56 toward the opening 58. Therefore, when the cleaning solution is output from the opening 58, a flow rate can be accelerated according to the principle of fluid mechanics and a suction force is generated by a vacuum negative pressure in the exhaust gas suction port 51 to prevent the solid particles from blocking the exhaust gas suction port 51. Alternatively, as shown in FIG. 4, the inner diameter of the jet nozzle 54 can also gradually decrease from the liquid injection port 56 toward the opening 58 in a section between the liquid injection port 56 and the opening 58. In order to obtain a better vacuum suction effect, a position of the exhaust gas suction port 51 of the hollow chamber 52 preferably corresponds to a position of the opening 58 of the jet nozzle 54.

In addition, the conveying pipe assembly 60 of the jet pipe 30 of the wet scrubber 10 of the invention communicates with a bottom end of the gas-liquid mixing pipe 50, that is, the conveying pipe assembly 60 communicates with a bottom end of the hollow chamber 52. Wherein, the conveying pipe assembly 60 comprises, for example, a hollow pipe 62 and a hollow diffusion pipe 64 that communicate with each other, wherein a part of the hollow diffusion pipe 64 is, for example, immersed in the cleaning solution in the treatment tank 20. In detail, the treatment tank 20 is composed of the inner tank 22 and the outer tank 24. Since an ejection outlet 65 of the hollow diffusion pipe 64 is immersed at a depth below a liquid level of the cleaning solution in the inner tank 22 of the treatment tank 20, rather than above the cleaning solution, it can surely bring the microbubbles into the depth of the cleaning solution contained in the treatment tank 20. Wherein, a numerical value of the depth is determined based on a height of the liquid level of the cleaning solution, for example. However, the above is only examples and the examples are not intended to limit the invention. In detail, in other applications, the ejection outlet 65 of the hollow diffusion pipe 64 can also be optionally disposed above the cleaning solution.

Figure 6:
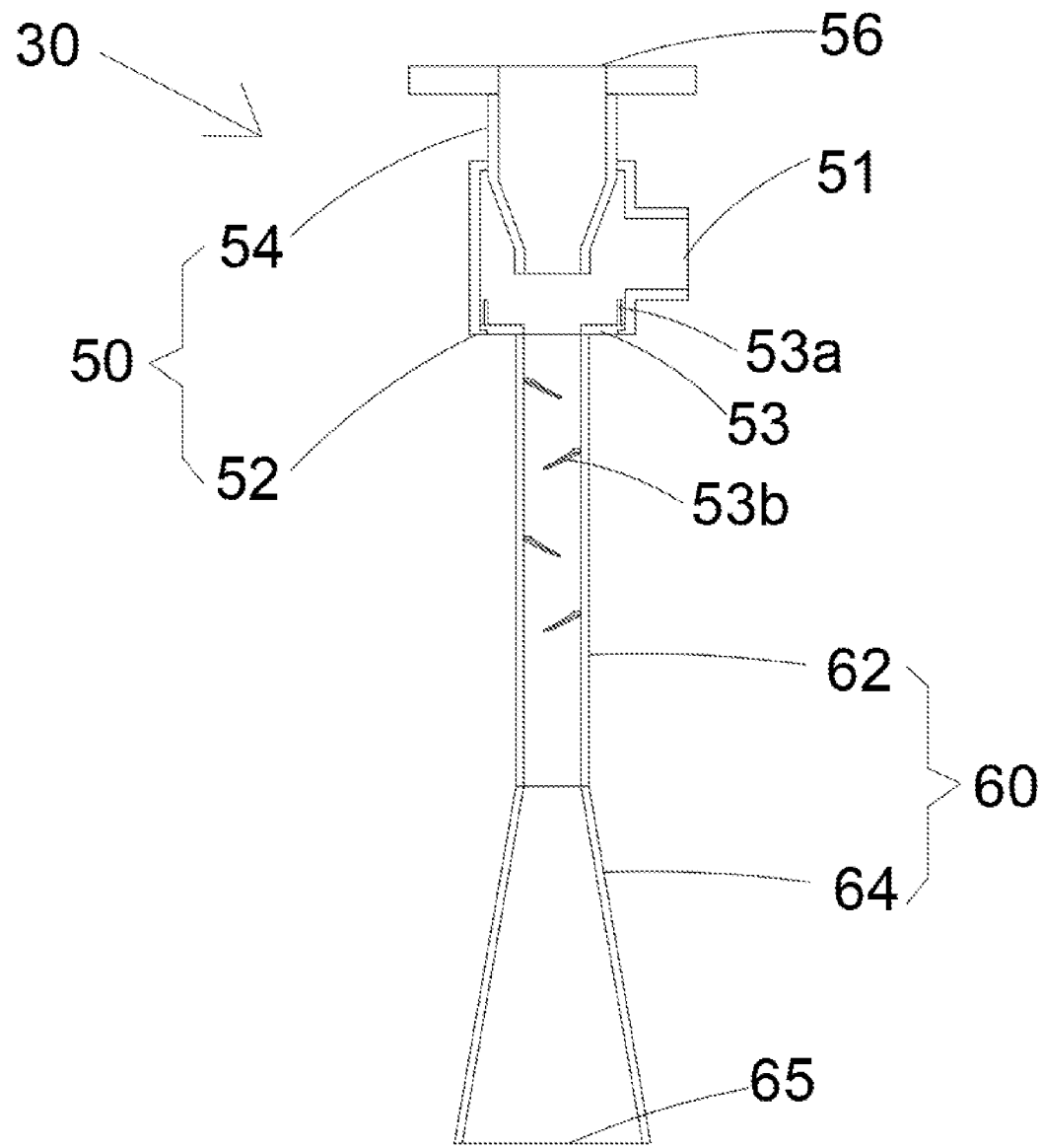
FIG. 6 is a side view of the wet scrubber of the invention with a hydraulic push-type rotary scraping structure implemented in one aspect.

In addition, please refer to FIG. 6, in another exemplary aspect, the hollow chamber 52 of the invention can optionally have the hydraulic push-type rotary scraping structure. For example, in the hydraulic push-type rotary scraping structure, a bottom plate 53 with a discharge port 53' of the invention is rotatably disposed on a bottom side of the hollow chamber 52, a top side of the bottom plate 53 is longitudinally provided with one scraper plate 53a or a plurality of scraper plates 53a, and the bottom plate 53 and/or a surface of the conveying pipe assembly 60 are/is distributed with fins 53b. When the jet nozzle 54 sprays the cleaning solution at a high speed, the cleaning solution can not only cut the exhaust gas into the microbubbles during the linear motion of the cleaning solution in the jet pipe 30, but also a peripheral liquid of the cleaning solution is capable of impacting the fins 53b and driving the bottom plate 53 to rotate. Therefore, the scraper plates 53a are capable of rotating with the bottom plate 53 in the hollow chamber 52, thereby effectively and automatically preventing the solid particles from depositing or scraping off the solid particles. Shapes of the scraper plates 53a and the fins 53b are, for example, but not limited to, straight, arcuate, or wing-shaped.

Figure 7:
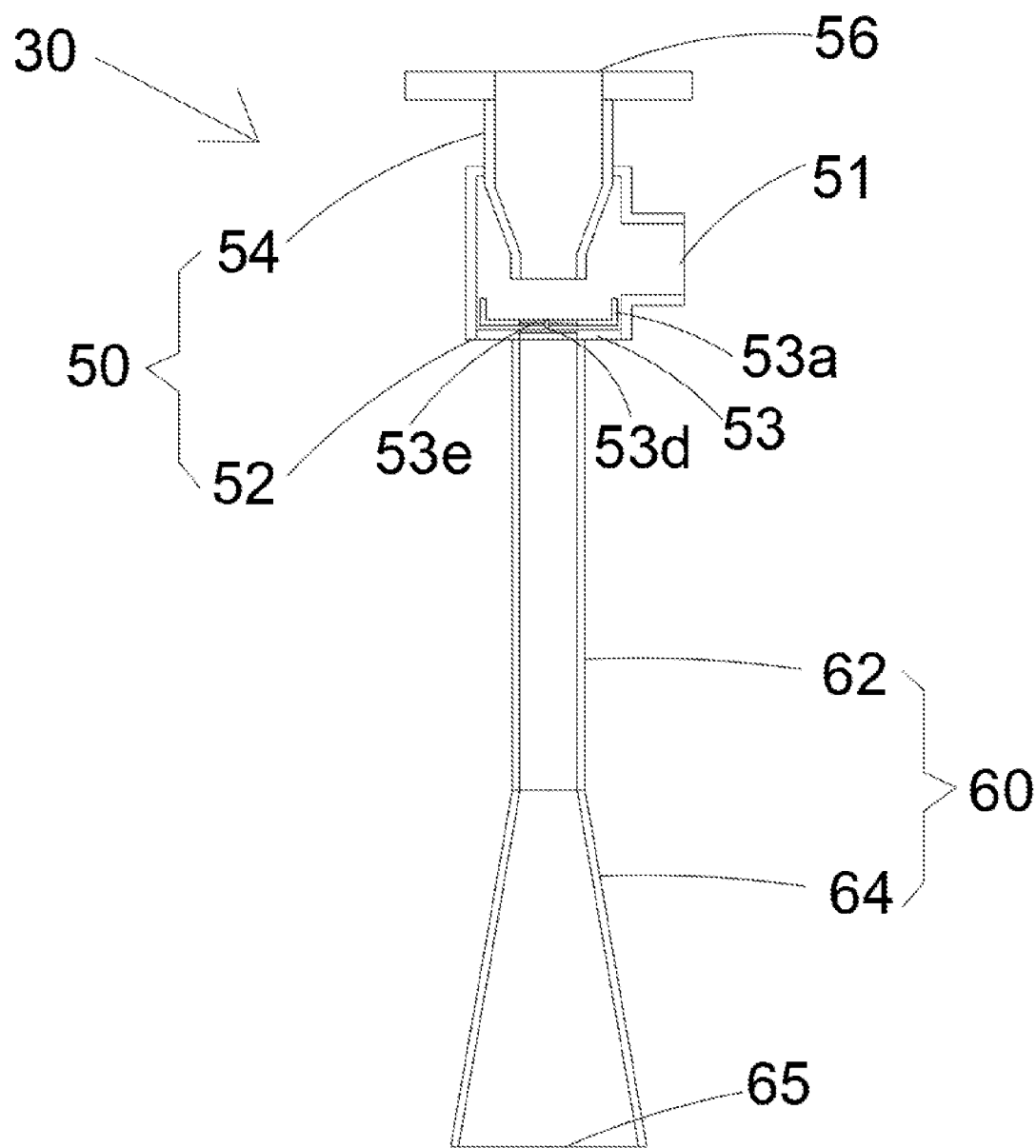
FIG. 7 is a side view of the wet scrubber of the invention with the hydraulic push-type rotary scraping structure implemented in another aspect.

Alternatively, as shown in FIG. 7, the hydraulic push-type rotary scraping structure of the invention is embodied by the one scraper plate 53a or more than one of the scraper plate 53a rotatably disposing on the bottom plate 53 of the hollow chamber 52 using a rotating shaft 53d. A shape of the scraper plate 53a is, for example, straight, arcuate, wing-shaped, or U-shaped, and preferably U-shaped (as shown in FIG. 7), wherein a bottom side of the U-shape has a diversion surface 53e corresponding exactly to the discharge port 53', and two pillars of the U-shape on both sides respectively abut against or are adjacent to a chamber wall of the hollow chamber 52, so that when the jet nozzle 54 sprays the cleaning solution at a high speed, the cleaning solution can move downward along the diversion surface 53e of the scraper plate 53a to drive the entire scraper plate 53a to rotate, thereby preventing the solid particles from depositing in the hollow chamber 52 or scraping off the solid particles that have been deposited in the hollow chamber 52. FIGS. 6 and 7 are only examples of the hydraulic push-type rotary scraping structure applicable to the invention, but a shape and a quantity thereof are not particularly limited, as long as the high-speed sprayed cleaning solution can be used to push to prevent the solid particles from depositing or scrape off the solid particles that have been deposited, any shape or structure can be applied to the invention.

Wherein, the wet scrubber 10 of the invention can optionally be provided with a liquid level detecting component 26 to detect a position of a liquid level of the cleaning solution contained in the treatment tank 20, that is, a height of the liquid level. A type of the liquid level detecting component 26 is not particularly limited, for example, design of disposing inside the tank or outside the tank can be adopted. For example, in the design of disposing outside the tank, a communicating pipe can be used to communicate the upper and lower sides of the treatment tank 20, and at least one water level sensor is provided on the communicating pipe, so that a position of the liquid level in the treatment tank 20 can be known to achieve an efficacy of indication or reminder function.

Figure 5:
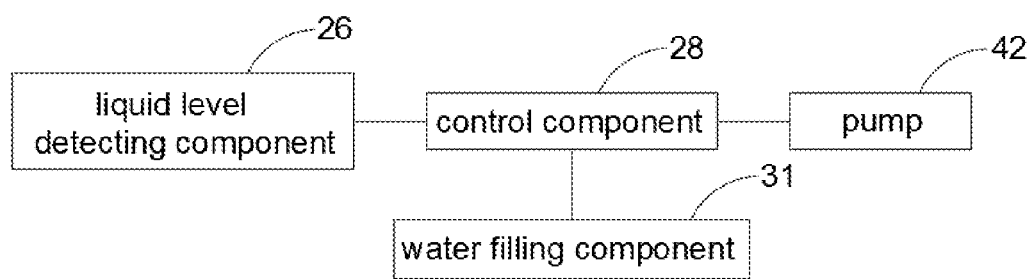
FIG. 5 is a circuit block diagram of a control component of the invention.

In addition, the wet scrubber 10 of the invention can optionally be provided with an electric control device such as a control component 28 (see FIG. 5). The control component 28 is, for example, electrically connected to receive sensing signals of the liquid level detecting component 26 and/or control operation of a pump 42 to control a flow rate of the cleaning solution cyclically injected into the jet pipe 30 through a circulation pipeline 40 and/or a flow rate of the exhaust gas introduced into the jet pipe 30 so as to achieve an effect of controlling a height of the liquid level of the cleaning solution contained in the treatment tank 20. Wherein, the pump 42 can be made of an anti-corrosion material, but it is not limited thereto. In the same way, the wet scrubber 10 of the invention can further optionally have a water filling component 31, the water filling component 31 can be controlled by the control component 28, for example, to replenish the cleaning solution (for example, water) in the treatment tank 20 according to a height of the liquid level of the cleaning solution. One end of the water filling component 31 can be communicated to the outer tank 24 of the treatment tank 20, and another end can be communicated to a water supply end, for example, to supply or replenish the cleaning solution in the treatment tank 20.

The circulation pipeline 40 of the wet scrubber 10 of the invention is used to discharge the cleaning solution from the treatment tank 20, and to repeatedly supply the cleaning solution into the treatment tank 20 through the jet pipe 30, so as to achieve an object of recycling. Wherein, one end of the circulation pipeline 40 is communicated to the treatment tank 20, for example, communicated to a bottom of the outer tank 24 and/or the inner tank 22 of the treatment tank 20, so that the pump 42 can be used to discharge the cleaning solution. In addition, another end of the circulation pipeline 40 injects the cleaning solution into the treatment tank 20 from a top side of the treatment tank 20. In detail, the other end of the circulation pipeline 40 is communicated to the jet pipe 30, and is communicated to the liquid injection port 56 of the jet nozzle 54, for example, so that a high pressure of the pump 42 is used to inject the cleaning solution into the jet pipe 30 at a high speed and the cleaning solution is caused to enter the inner tank 22 of the treatment tank 20 again, thereby the exhaust gas is further sucked out from the exhaust gas conveying pipe 70 and the cleaning solution is mixed with the exhaust gas sucked into the hollow chamber 52 of the jet pipe 30. The circulation pipeline 40 is further optionally provided with a filter component 44 for filtering the cleaning solution discharged from the outer tank 24 of the treatment tank 20, wherein the filter component 44 is a filter screen such as a cotton filter, and preferably a Y-type filter (see FIG. 3) to filter out the solid particles in the cleaning solution.

Another technical feature of the invention is that the circulation pipeline 40 is further communicated with at least one bypass pipeline 46 on two sides of the filter component 44, and the circulation pipeline 40 is further provided with valves, for example, on the two sides of the filter component 44, so that the cleaning solution changes a path and flows through the bypass pipeline 46, thereby maintenance personnel can replace a filter screen in the filter component 44 without interrupting the overall cleaning process.

Another technical feature of the wet scrubber 10 of the invention is that a gas-liquid separation component 80 is further optionally provided above the cleaning solution in the treatment tank 20, and preferably provided above the inner tank 22, so as to filter and block water mist of the cleaning solution in the inner tank 22 raised up from stirring by a large amount of the microbubbles. In addition, the gas-liquid separation component 80 is capable of filtering and reducing the water mist composition above the cleaning solution contained in the treatment tank 20, so as to allow only the exhaust gas after washing treatment to pass through the gas-liquid separation component 80 and discharge directly from the exhaust port 92 of the treatment tank 20. Wherein, the gas-liquid separation component 80 is, for example, a fiber bed demister composed of glass fibers with a diameter of about 100 μm to 1 μm.

The wet scrubber 10 of the invention is further optionally provided with a spray component 82 located in the treatment tank 20. The spray component 82 is, for example, a sprayer, and for example, is disposed on the cover 27 for atomizing the cleaning solution, and sprays the atomized cleaning solution toward the exhaust gas above the cleaning solution contained in the treatment tank 20, thereby dissolving the exhaust gas above the cleaning solution contained in the treatment tank 20 and/or capturing the solid particles in the exhaust gas. Since the spray component 82 is preferably located above the gas-liquid separation component 80, and the spray component 82 preferably sprays the atomized cleaning solution in a direction of the gas-liquid separation component 80, the solid particles on the gas-liquid separation component 80 can be washed away, and the solid particles are dropped into the treatment tank 20 to prevent the solid particles from clogging the gas-liquid separation component 80. Wherein, a quantity of the spray component 82 is not particularly limited. In the traditional technology, the fiber bed demister is not suitable for direct use in the treatment of airflow containing microparticles. The reason is that a diameter of the glass fiber of the fiber bed demister is very small (about 100 μm to 1 μm in diameter), so the solid particles will quickly block the fiber bed demister. By comparison, one of the technical features of the invention is that the spray component 82 is used to spray the atomized cleaning solution to wash the fiber bed demister, so most of the solid particles can be removed with high efficiency, and long-term operation will not block the fiber bed demister. For the same reason, the exhaust port 92 of the treatment tank 20 of the invention can also be optionally provided with another gas-liquid separation component (fiber bed demister) to further reduce the water mist composition in the exhaust gas directly discharged from the exhaust port 92.

The wet scrubber 10 of the invention is further optionally provided with a cooling component 90 to reduce a temperature of the cleaning solution contained in the treatment tank 20 in order to improve a solubility of the exhaust gas in the cleaning solution, and at the same time to ensure that a temperature of the cleaning solution will not continue to increase due to chemical reactions, even reaching a boiling point. Wherein, since the cooling component 90 is installed to reduce the temperature of cleaning solution, its installation position and mode are not particularly limited, as long as the temperature of the cleaning solution in the treatment tank 20 can be lowered. For example, the cooling component 90 can be directly disposed inside the treatment tank 20, so as to directly reduce the temperature of the cleaning solution. In addition, the cooling component 90 can also be disposed outside the treatment tank 20, for example, and communicated to the inside of the treatment tank 20 via a communicating pipe, so that the cleaning solution in the treatment tank 20 passes through the cooling component 90 and then returns to the treatment tank 20, thereby reducing the temperature of the cleaning solution. In the same way, the cooling component 90 can also be optionally disposed on the circulation pipeline 40, and for example, disposed inside or outside the circulation pipeline 40. In addition, the cooling component 90 can be any type of cooling device, for example, provided with a condenser pipe to cool the temperature of the cleaning solution.

In summary, according to the wet scrubber of the invention, the wet scrubber can have one or more of the following advantages: (1) A large amount of the microbubbles can be generated by the jet pipe to reduce a size of the exhaust gas bubbles, and significantly increase a surface area of the exhaust gas and the solid particles in contact with the cleaning solution, thereby capable of greatly improving a reaction efficiency of the exhaust gas and the solid particles with the surrounding cleaning solution. At the same time, due to the small buoyancy of the microbubbles, a speed of movement in the solution is slowed down, which can increase the time for the exhaust gas and solid particles to stay in the cleaning solution, thereby capable of more effectively capturing the solid particles and dissolving the exhaust gas in the cleaning solution. (2) The jet pipe is capable of generating suction to effectively suck out the exhaust gas in the exhaust gas conveying pipe, preventing deposition of the solid particles carried by the exhaust gas. (3) A temperature of the cleaning solution can be lowered by disposing the cooling component to improve a solubility of the exhaust gas, while ensuring that the cleaning solution will not continue to increase in temperature due to chemical reactions. (4) By disposing the gas-liquid separation component, the water mist composition in the discharged exhaust gas can be reduced. (5) By disposing the spray component, the gas-liquid separation component can be washed and the exhaust gas can be dissolved and/or the solid particles carried by the exhaust gas can be captured. (6) By disposing the bypass pipeline, when maintenance personnel replace the filter screen in the filter component, the cleaning solution can change a path and flow through the bypass pipeline, so there is no need to interrupt the overall cleaning process. (7) By disposing the maintenance port, maintenance personnel can perform repair or maintenance in the treatment tank without disassembling the entire structure. (8) With the treatment tank designed to be an assembled type, the invention is not limited to a height of an installation site of the wet scrubber.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A wet scrubber at least comprising:
   a treatment tank used to contain a cleaning solution, wherein the treatment tank comprises an inner tank and an outer tank, and a side surface of the inner tank has a through hole communicated to the outer tank;
   a jet pipe disposed in the treatment tank, the cleaning solution being injected into the treatment tank in a linear motion through the jet pipe, thereby generating a negative pressure to suck in an exhaust gas and performing a washing treatment on the exhaust gas, wherein the cleaning solution mixes with the exhaust gas in the washing treatment and cuts the exhaust gas into a plurality of microbubbles and a time the microbubbles stay in the cleaning solution is increased by increasing a surface area per unit volume of the microbubbles, so as to efficiently dissolve the exhaust gas and capture solid particles in the exhaust gas;
   a gas-liquid separation component located above a liquid level of the cleaning solution contained in the treatment tank to filter and block water mist raised in the cleaning solution, thereby allowing only the exhaust gas after the washing treatment to pass through the gas-liquid separation component and directly discharging the exhaust gas from an exhaust port of the treatment tank; and a spray component located above the gas-liquid separation component to prevent the solid particles from blocking the gas-liquid separation component.

2. The wet scrubber as claimed in claim 1, further comprising a circulation pipeline, one end of the circulation pipeline being communicated to the treatment tank to discharge and filter the cleaning solution, another end of the circulation pipeline being communicated to the jet pipe to cyclically inject the cleaning solution into the treatment tank through the jet pipe in the linear motion, wherein the cleaning solution is injected into the jet pipe through the circulation pipeline.

3. The wet scrubber as claimed in claim 2, wherein the circulation pipeline is further provided with a filter component to filter the cleaning solution discharged from the treatment tank.

4. The wet scrubber as claimed in claim 3, wherein the circulation pipeline is further communicated with a bypass pipeline on two sides of the filter component, so that the negative pressure is continuously generated to suck in the exhaust gas when the filter component is replaced.

5. The wet scrubber as claimed in claim 1, further comprising a cooling component for reducing a temperature of the cleaning solution contained in the treatment tank to increase a solubility of the exhaust gas.

6. The wet scrubber as claimed in claim 1, wherein the gas-liquid separation component is a fiber bed demister, and a glass fiber diameter of the fiber bed demister is between 100 μm and 1 μm.

7. The wet scrubber as claimed in claim 1, further comprising another gas-liquid separation component provided at the exhaust port of the treatment tank, wherein the other gas-liquid separation component is a fiber bed demister, and a glass fiber diameter of the fiber bed demister is between 100 μm and 1 μm.

8. The wet scrubber as claimed in claim 1, further comprising a water filling component to replenish the cleaning solution into the treatment tank according to a height of a liquid level of the cleaning solution.

9. The wet scrubber as claimed in claim 8, further comprising at least one liquid level detecting component for detecting the height of the liquid level of the cleaning solution contained in the treatment tank.

10. The wet scrubber as claimed in claim 1, further comprising a control component for controlling a flow rate of the cleaning solution injected into the jet pipe and/or a flow rate of the exhaust gas introduced into jet pipe.

11. The wet scrubber as claimed in claim 1, wherein a time for the microbubbles to stay in the cleaning solution is inversely proportional to an average diameter of the microbubbles, and the average diameter of the microbubbles is less than 1.0 mm.

12. The wet scrubber as claimed in claim 1, wherein a time for the microbubbles to stay in the cleaning solution is between 1 second and 10 seconds.

13. The wet scrubber as claimed in claim 1, wherein a time for the microbubbles to stay in the cleaning solution is between 5 seconds and 10 seconds.

14. The wet scrubber as claimed in claim 1, wherein the cleaning solution contained in the treatment tank accounts for 50% to 90% of a chamber volume of the treatment tank.

15. The wet scrubber as claimed in claim 1, wherein the jet pipe comprises:
a gas-liquid mixing pipe comprising a hollow chamber and a jet nozzle communicated with each other, wherein the cleaning solution is injected from a liquid injection port at a top of the jet nozzle and ejected into the hollow chamber from an opening of the jet nozzle, a side surface of the hollow chamber is provided with a suction port for sucking in the exhaust gas; and
a conveying pipe assembly communicated to a bottom end of the hollow chamber, the conveying pipe assembly comprises a hollow pipe and a hollow diffusion pipe communicated with each other, wherein an ejection outlet of the hollow diffusion pipe is immersed in the cleaning solution contained in the treatment tank.

16. The wet scrubber as claimed in claim 15, wherein the jet pipe further comprises a hydraulic push-type rotary scraping structure disposed in the hollow chamber, and the hydraulic push-type rotary scraping structure is operated by the cleaning solution in the linear motion to prevent the solid particles from depositing or remove deposition of the solid particles.

17. The wet scrubber as claimed in claim 16, wherein the hydraulic push-type rotary scraping structure comprises a scraper plate rotatably disposed on a bottom plate of the hollow chamber, and the scraper plate is rotated by the cleaning solution in the linear motion.

18. The wet scrubber as claimed in claim 16, wherein a bottom plate of the hollow chamber is rotated by the cleaning solution in the linear motion, and the hydraulic push-type rotary scraping structure disposed on the bottom plate of the hollow chamber rotates with the bottom plate of the hollow chamber.

19. A wet scrubber for removing solid particles in an exhaust gas, at least comprising:
a treatment tank used to contain a cleaning solution, wherein the treatment tank is composed of an inner tank and an outer tank, and the inner tank is communicated to the outer tank;
a jet pipe disposed in the treatment tank, the cleaning solution being injected into the inner tank of the treatment tank in a linear motion through the jet pipe, thereby generating a negative pressure to suck in the exhaust gas and performing a washing treatment on the exhaust gas to form a plurality of microbubbles in the cleaning solution to dissolve the exhaust gas and capture the solid particles in the exhaust gas, an average diameter of microbubbles being less than 1.0 mm, a time for the microbubbles to stay in the cleaning solution being as long as 10 seconds;
a gas-liquid separation component disposed in the treatment tank to filter and block water mist of the cleaning solution raised by the microbubbles in the treatment tank, so that only the exhaust gas with the solid particles being removed passing through the gas-liquid separation component and directly discharging from an exhaust port of the treatment tank, wherein the gas-liquid separation component is a fiber bed demister, and a glass fiber diameter of the fiber bed demister is between 100 μm and 1 μm;
a spray component disposed in the treatment tank and spraying atomized cleaning solution toward the gas-liquid separation component to wash away and remove the solid particles blocking the gas-liquid separation component; and
a circulation pipeline, one end of the circulation pipeline being communicated to the treatment tank to discharge and filter the cleaning solution, another end of the circulation pipeline being communicated to the jet pipe, wherein the cleaning solution is injected into the jet pipe through the circulation pipeline.

* * * * *